(12) United States Patent
Unsworth et al.

(10) Patent No.: US 6,494,657 B2
(45) Date of Patent: Dec. 17, 2002

(54) SELF-ADJUSTING, HIGH STRENGTH, SCREW SYSTEM

(76) Inventors: John D. Unsworth, c/o Vasotech Corp., 7 Innovation Drive, Suite 107, Flamborough, Ontario (CA), L9H 7H9; Thomas Waram, 1063 King Street, West Suite 204, Hamilton, Ontario (CA), L85 1L8

( * ) Notice: Subject to any disclaimer, the term of this patent is extended or adjusted under 35 U.S.C. 154(b) by 2 days.

(21) Appl. No.: 09/882,072

(22) Filed: Jun. 18, 2001

(65) Prior Publication Data

US 2001/0053317 A1 Dec. 20, 2001

Related U.S. Application Data

(60) Provisional application No. 60/212,673, filed on Jun. 20, 2000.

(51) Int. Cl.[7] .................................................. F16B 35/04
(52) U.S. Cl. .......................... 411/412; 411/16; 411/438
(58) Field of Search .................................. 411/411, 412, 411/413, 308–311, 305, 306, 16–18, 438, 909, 324

(56) References Cited

U.S. PATENT DOCUMENTS

| | | | | |
|---|---|---|---|---|
| 1,230,603 A | * | 6/1917 | Richmond |
| 1,468,074 A | * | 9/1923 | Peirce |
| 2,777,718 A | * | 1/1957 | Vegren |
| 3,515,027 A | * | 6/1970 | Textrom |
| 4,040,326 A | * | 8/1977 | Breed |
| 5,312,214 A | * | 5/1994 | Morton |
| 5,536,126 A | * | 7/1996 | Gross |
| 6,276,883 B1 | * | 8/2001 | Unsworth |

* cited by examiner

Primary Examiner—Flemming Saether

(57) ABSTRACT

A fastener system includes a screw or bolt having two interleaved helical threads which bracket a helicoil. The helicoil expands and torques by various means to maintain hold and purchase between the screw coil combination and the substrate into which the screw and helicoil are inserted even when the substrate recedes a significant distance from the screw and helicoil combination. The two interleaved threads hold the coil and prevent it from rolling over the threads in high load applications.

21 Claims, 4 Drawing Sheets

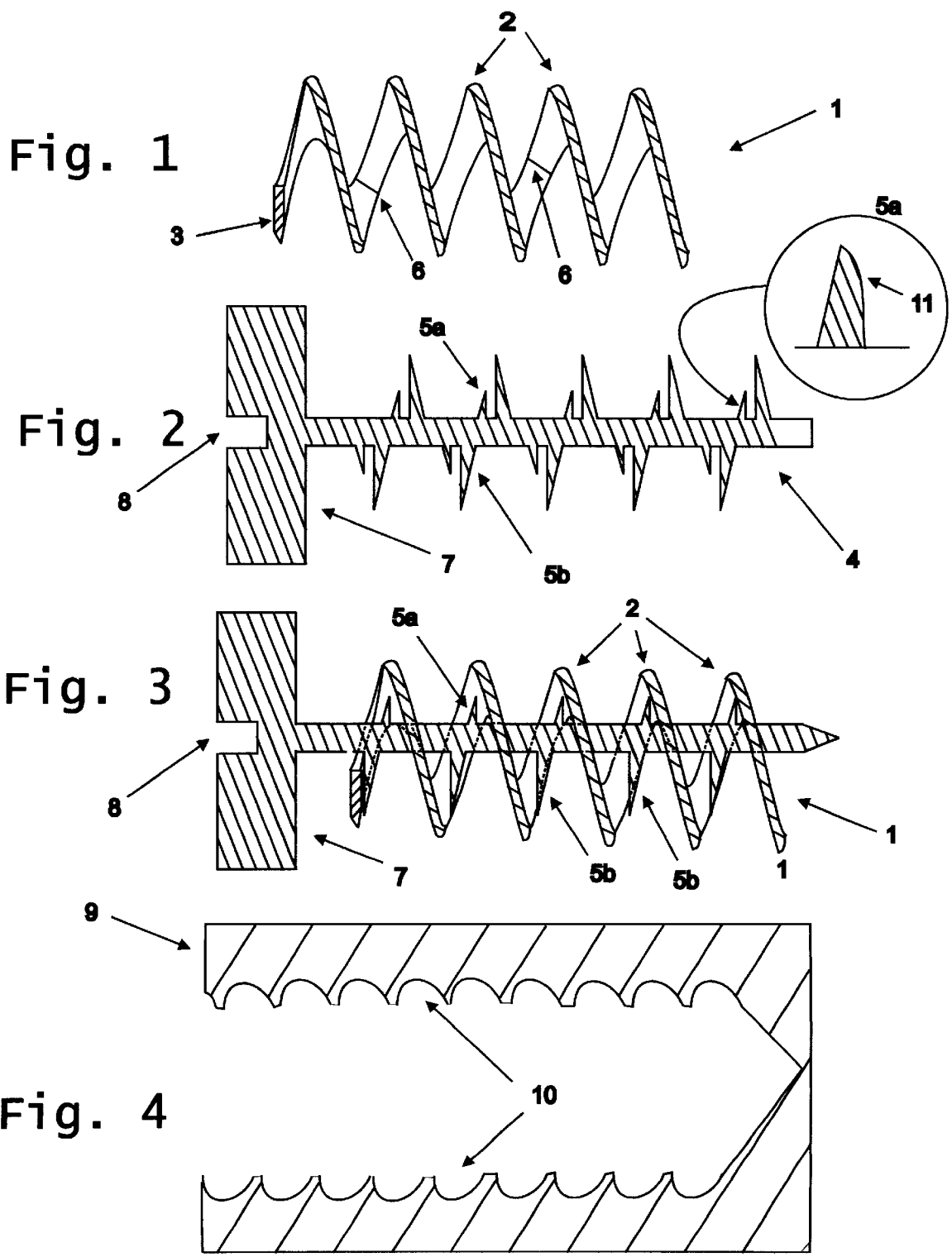

SELF-ADJUSTING, HIGH STRENGTH, SCREW SYSTEM

This application claims the benefit of Provisional Application No. 60/212,673, filed Jun. 20, 2000.

FIELD OF THE INVENTION

The field of the invention is mechanical fasteners mainly for orthopedic use, for high vibration environments and for substrates subject to erosion.

BACKGROUND AND SUMMARY OF THE INVENTION

Screws are used to hold together various materials and generally depend upon wedging the threads and shaft of the screw into the substrate into which the screw is driven for a secure connection. However, this wedging action applies forces and resulting stresses on substrate that in certain circumstances speed substrate degradation at or adjacent to the screw and substrate interface and this in turn may lead to the loosening of the screw.

An example of this effect occurs in orthopedic screws that are driven into bones. These screws can damage the bone cells at and near the bone and screw interface, causing the bone to slowly recede from the screw and eventually causing the screw to loosen.

Another example occurs in wood where the wedging forces crushes the wood adjacent to the wood and screw interface. Also stone and concrete often crack due to the wedging forces of normal screws and bolts, especially where they are located near edges. In metal fabrication where the wedging action of a screw being driven into a metal substrate can alter the metallurgy of the substrate immediately adjacent to the screw and substrate interface. This metallurgical alteration can in certain circumstances speed corrosion and lead eventually to fastener failure.

In many cases there is a very limited elastic range in the substrate into which the screw is driven. Any recession of the substrate from the original substrate and screw interface will result in a dramatic reduction in the wedging force that the screw depends upon for purchase and hold, since the reaction forces exerted by the rigid substrate fall off rapidly with substrate recession.

One method presently used to increase the holding power of the screw is to attach a spring washer beneath the head of the screw that increases the function and wedging forces between the thread of the screw and the substrate into which the screw is driven. The difficulty with this approach is that the spring washer pulls the screw out of the lumen into which it is driven rather than pushing it in. If the screw does become loose for any reason, this pulling force may act to accelerate the further loosing of the screw. A further difficulty with this method is that it often exerts uneven pressure on different parts of thread of the screw. This uneven application of pressure can result in lower overall friction available to keep the screw secure in the substrate and also increase in some cases the damage to the substrate that in turn may cause further loosing.

What is needed is a screw system that does not depend principally upon the wedging forces to maintain its purchase and hold in the substrate.

What is also needed is a screw system that tends to push the screw into the substrate into which it is driven rather than pull it out.

What is also needed is a screw system that evenly distributes the frictional forces along the interface between the screw and the threat on which it slides.

What is also needed is a screw system that can maintain steady holding forces, even as the substrate recedes away from the screw.

U.S. patent application Ser. No. 09/541,508 by Unsworth and Waram, entitled "Self Adjusting Screw System", which patent is incorporated herein by specific reference describes various means to meet the requirements set out above. The present invention describes a system that permits higher holding forces to be maintained and in some preferred embodiments does not require adhesives to hold the screw and coil of the system together for the application of torque and radial loading to the coil prior to insertion.

The present invention is a screw system that maintains purchase and hold in the substrate by maintaining a relatively low and constant force normal to the longitudinal axis of the screw even if and as the substrate recedes away from the screw and substrate interface. This force normal to the said longitudinal axis of the screw can be kept relatively constant and can be established in advance for various specific purposes to prevent unnecessary damage to the substrate into which it is inserted. Also the screw system expands as the substrate recedes maintaining intimate contact between the two. Additionally the screw system may apply a controlled and relatively constant force parallel to the longitudinal axis of the screw, pushing the screw into the hole into which it is driven and increasing the friction between the screw and the thread into which it driven thereby reducing the chance of the screw turning back out the hole.

A preferred embodiment of the invention is a system comprised of a screw and a coil or helicoil (the terms having the same meaning in this patent). Both the screw and the coil are inserted into the substrate. The helicoil is a coil formed usually from metal wire, but can be formed from any material that can have springiness imparted to it, including plastic and biodegradable plastic. The screw threads into the center of the coil, the turns of which, on the interior surface, describe the thread that meshes with the threads of the screw. The outside of the coil also forms a thread which can in turn be threaded into a thread tapped or cut into the interior walls of a hole in the substrate into which the screw and coil system are driven. In the event that the walls of the hole are not prepared with a thread, the coil may still be screwed into the hole and the coil itself will press or cut threads which will mesh with those threads (formed by the turns of the coil) on the outside of the coil.

This combination of screw and coil are well known to the art. U.S. Pat. No. 4,712,955 by Reece et al. describes a screw and helicoil system where the screw is larger than the helicoil and forces the helicoil out normal to the longitudinal axis of the coil and screw, utilizing ramp-like threads on the screw and receivers on the inside of the coil. This action creates very strong wedging forces that hold the screw and coil assembly in the hole of the substrate. This method while suitable for some purposes is not suitable where the substrate is likely to recede away from the original interface between the coil and the substrate. As explained above, even thought the wedging forces are very high, they are maintained over a small distance normal to the longitudinal axis of the coil and screw, and drop off dramatically when the substrate recedes away from the said interface.

The preferred embodiment of the invention includes a coil and screw system, but the coil, by various means tends to expand once it is inserted into a substrate independently, and not by being forced to do so by another element of the attachment system. These means are referred to herein as "expansion means". While expansion is desirable, it must not be at the expense of the loosing of the screw from the substrate as the coil moves away from the screw in response to the coil following the recession of the substrate. The U.S. patent application Ser. No. 09/541,508 by Unsworth and Waram above referred to describes means for ensuring that the connection between the screw and coil is maintained under these conditions, and these means can be combined with the preferred embodiments herein described to effect the same purpose.

Unlike the wedging action of the conventional screw or conventional screw and coil combination, the coil will expand radially a relatively large distance following any recession of the substrate away from the original substrate coil interface and especially if superlastic shape memory alloy (SMA) material is used for the coil the forces exerted by the expanding coil on the interfacing substrate into which the screw and coil are driven will be relatively even, predictable and repeatable. The expanding screw and coil combination will also by various means described below maintain the purchase and hold of the screw and coil combination on the lumen of the substrate into which the said combination are driven.

A preferred embodiment of the invention includes means that tend to increase the friction between the coil and the screw and at the same time draw the screw further into the lumen of the substrate into which the screw and coil are inserted. These means are referred to herein as "torquing means" and "corrugating means".

Preferred embodiments of the invention may incorporate either those features that tend to expand the coil, once in the substrate; or those features that tend to increase friction between the coil and the screw and draw the screw into the said lumen; or both.

Expansion means both involve wrapping the coil around the screw and then introducing new conditions that allow it to expand. The first such means is to start with a coil, having springiness, that in its unloaded state has a lumen diameter larger than the outside diameter of the screw around which it will be threaded. When the coil is tightly wound around the screw, the turns of the coil falling between the interleaved double threads of the screw so that they mesh, the coil will assume a more compact diameter, and if restrained by some means in this compact form will expand when the restraining means are later removed. The springy material would include conventional spring metal plastic or superlastic material, the latter of which is shape memory alloy (SMA) material that is above its austenite finish temperature in both its compressed and expanded form.

The second means to effect the expansion of this coil is to use a coil that is made of shape memory alloy (SMA) material that has been shaped set at high temperature to form a coil that has a lumen diameter larger than the outside diameter of the screw around which it will be wound. When the coil is cooled below its martensitic finish temperature, that is it is pliable, it is wound tightly around the outside diameter of the screw, the turns of the coils falling between the interleaved double threads of the screw so that they mesh. The coil will then assume a more compact diameter than it's heat set size before cooling. When the coil is then heated to a temperature equal to or above its austenite finish temperature the high temperature or larger diameter shape will be recovered and the coil will expand.

Torquing means can similarly by imparted into the coil. Torquing occurs where twist is imparted to the wire along the longitudinal wire axis that forms the coil, or in the case of a coil fabricated from a tube, where twist is imparted to the tubular member that forms the coil, along its longitudinal tube axis. Torquing can occur by simply compressing or pulling the coil spring along the longitudinal axis of the gross coil (as distinguished from the longitudinal axis of the member forming the coil). Torquing may also occur in a more direct manner by grasping and twisting part or parts of the coil spring along the axis that runs longitudinally through the wire or tubular member that forms the coil. This special way of imposing torque on the spring is referred to in this patent as "tilting".

For example, the coil may be made of a wire with a rectangular cross-section, rather than the customary round one, the short sides forming the outside and inside surfaces of the coil and the long sides forming the facing surfaces between the turns of the coil. Such a coil would look like a Slinky-Toy™. These turns, of the Slinky-Toy for example, are flat having the longitudinal axis of their rectangular cross-sections approximately normal to the longitudinal axis of the gross coil. Now if the said cross-sections of these turns, unlike a Slinky-Toy™, were angled in their unloaded state such that their longitudinal axes formed a 45 degree angle with respect to the plane passing normal through the longitudinal axis of the gross coil, each turn of the coil (if it consisted of a solid loop) would form a coned-disk shape. This shape not coincidentally would be similar to that of a belleville washer. If the coil was made of springy material, each turn of the coil would act like a belleville washer if force was applied to move the turns, or tilt their cross-sections from their unloaded angled, coned-disk configuration to their loaded flat configuration (or some configuration having a different angle than the unloaded configuration). Any coil can be tilted, but most convenient are those with cross-sections that provide points of purchase such as a rectangle, diamond, cam or triangle.

Tilting (the special way of applying torque as described above) means can similar to expanding means be effected by two physically related routes. The first route is to tilt coil turns of a springy material as described in the immediately preceding paragraph and then detachably attach the turns of the coil along all or part of its surface of the screw, such that when the constraints of the attachment are removed, the turns of the coil so treated will unload and spring back tending to project the screw further into the substrate into which it is driven by reacting against the threads of the lumen of the substrate on one hand, and on the threads of the screw on the other. The springy material that comprises the coil can include conventional spring metal, plastic or superlastic material, the latter of which is shape memory alloy (SMA) material that is above its austenite finish temperature in both its compressed and expanded form.

The second route is to make the coils from shape memory alloy (SMA) material and impart at high temperature, typically in the range of 400–500° C., for nitinol SMA for example, a cross-sectional shape, that will be recovered after the coil is cooled to a temperature equal to or below the martensite finish temperature and then heated to a temperature equal to or above its austenitic finish temperature. The shape so imparted will be such that when it is constrained below the martensitic start temperature and then subsequently heated to or above the austenitic finish temperature it will have tilt imparted into the turns of the coil. Since the SMA material has been heated to or above the austenite finish temperature it will be superlastic and be springy and therefore be able to spring back and as in the preceding example tending to push the screw on which it is turned forward into the substrate. If the high temperature cross-sectional shape is the same as the previous example, that is, the longitudinal axis of the coil cross-section in its unloaded state is angled 45 degrees with respect to the plane passing normal through the longitudinal axis of the gross coil, and while below the martensitic finish temperature is flattened so that the same longitudinal axis of the coil cross-section is parallel to the plane passing normal through the longitudinal axis of the gross coil; and if the coil is then constrained to maintain the said flattened cross-section, when the coil is heated to or above its austenite finish temperature it will become tilted. Once tilted the coil being now superlastic and springy may spring back and as in the previous example tend to push the screw forward into the substrate.

The turns of the coil can also be corrugated rather than tilted. The coil would meander back and forth so that the ribs of the corrugations would begin at the inside lumen of the coil and radiate or proceed out to the outside surface of the coil, usually normal to the longitudinal axis of the coil, but other angles or curves could be used in some preferred embodiments as described in the detailed description of the drawings below. This type of treatment would in some preferred embodiments of the invention be applied to the Slinky-Toy™ type of coil, that is one with an approximate square or rectangular cross-section. This treatment could be in addition to or instead of the tilting means elsewhere referred to herein. The means for accomplishing this would be similar to those used to effect the expanding means above. The corrugated coil could be made of springy material and in its unloaded condition could be flattened and restrained by detachable attachment on to the screw. When unloaded the coil would unload into its corrugated form and spring back tending to project the screw further into the hole into which it is driven by reacting against the threads of the lumen of the substrate on one hand, and on the threads of the screw on the other. This springy material would include conventional spring metal plastic or superlastic material, the latter of which is shape memory alloy (SMA) material that is at or above its authentic finish temperature in both its compressed and expanded form. Similarly the material could be made of shape memory metal (SMA) material, this method making use of the shape recovery regime. The recovered shape could be corrugated. The corrugated coil could be flattened into its uncorrugated form at a temperature equal to or below the martensite finish temperature and attached to the screw. When heated to or above its austenitic finish temperature and constrained into its flattened shape, the corrugated shape would be recovered, loaded and be superlastic and when no longer constrained would spring back tending to project the screw further into the hole into which it is driven by reacting against the threads of the lumen of the substrate on one hand, and the threads of the screw on the other. Rather than corrugate the coil, The coil could of course be a hollow tube and can have a compact and expanded form effect by the same means as the corrugated coil for the same purpose of providing spring-back to move the screw further into the substrate and increasing the frictional forces maintaining the screw in position.

Finally, tilting means can be additionally applied to any or any combination of methods above noted by turning the screw inside the coil while the turns of the coil are constrained by the threads of the substrate into which the screw and coil are inserted and the forward progress of the screw is stopped by the head of the screw abutting the said substrate or the tip of the screw striking a part of the substrate that prevents the screw from advancing any further. When this occurs, the threads of the screw will tend to pull the inside of the coil, to which it interfaces, in a direction opposite to the direction the screw is driven into the hole in the substrate. This is especially the case if the turns of the coil are loosely fitted between the interleaved double threads and/or the radial diameter of the coil is greater than the radial diameter of the distal or proximal thread, or both. When the screw is turned no more, and if the said coil is made of spring material the spring-back of the said coil will tend to project the screw further into the hole into which it is driven by reacting against the threads of the lumen of the substrate on one hand, and the threads of the screw on the other.

As the coil expands, it also unwinds, and therefore if a very long threaded section is required, it is preferable that a series of small coils be placed end to end to make up the long section desired. This will reduce the friction at the coil and substrate interface which might otherwise prevent the coil from unwinding and expanding. These small coils may be separate or detachably attached so that they separate once placed inside the lumen of the said hole in the substrate. The easiest means of making the coils detachably attach is to introduce a crack or groove at intervals along the length of the wire forming the coil, such that separation will occur when the screw is turned sufficiently causing twisting forces to be imparted to the coil.

While the coil, tang or tangless, can be inserted into the substrate using helicoil insertion devices well known to the art, the preferred embodiment loads the coil onto the screw prior to insertion into the substrate as assumed above. If the coil is inserted into the substrate using an insertion tool, it will obviously require means to detachably attach the coil similar to those utilized in the screw and coil combination described in more detail herein, therefore a preferred embodiment of this invention would include an insertion tool that would have those same features as the screw and coil combination described herein.

These restraining means referred to in this patent require in most cases a detachable attachment at one or more places along the interface between the coil and the screw that and are well known to the art and include a pressure fit, pressure welding, tack welding, adhesives, flexible adhesives and biodegradable adhesives as well as water solvent adhesives the last of which would be of particular use for orthopedics and for wood work. Plastic clips or a plastic sheath can also be used that might be biodegradable or simply peal back, split or be deformed as the coil and screw are driven into the substrate. The preferred embodiment provides means for breaking the detachable attachment when the screw imparts sufficient twisting forces onto the coil as the screw is finally tightened and the coil is distorted by the action of the screw. The tacking materials could also be biodegradable and dissolve over time in the presence of solvents such as water, or corrode by biochemical or electrochemical action for example, galvanic action. Adhesive materials or mechanical attachments between the coil and the screw will be weaker transverse to the axis of the coil wire or tube, rather than parallel to it, since the coil will more easily roll in the transverse direction in response to torquing forces, than in the parallel direction where bending forces of the coil are required. This allows for the coil to be pulled into the substrate with a relatively weak bond between the coil and the screw, but once in the substrate, only a relatively little torquing action, that causes the coil to roll on the screw, is required to break the bond.

In the case of orthopedic use, the use of a coil and screw combination permits greater ease of removal of the screw without damaging the bone tissue. The screw can be turned out and the threads will slide along the turns of the coil, rather than scraping along the bone. The coil can be pulled out using helicoil removal devices well known to the art, but in most cases will be left in the bone as the coil is small and is soon engulfed by the growing bone. For orthopedic use, if the coil is made from superlastic shape memory alloy (SMA) material, the system that is the subject of this invention has the additional advantage that it applies the connecting forces with relatively constant forces over significant distances even as the relative positions of the attachment system and the bones change by bone recession and growth. This feature also applies to all other uses.

The even and predicable forces exerted by a coil made of superelastic material, for example superelastic nitinol alloy, on the substrate are primarily due to the relatively consistent unloading bending forces exerted by the turns of the coil as radial forces on the substrate, as the "wound up" and constrained coil is released or sprung back after or during installation of the screw/coil assembly. All or some of the turns of a superelastic coil are preloaded primarily in bending prior to installation of screw-coil assembly, by the application of a bending moment, such that the curvature of each preloaded turn is increased relative to the curvature of the turn in the unloaded state, in which no bending moment is applied. A possible loading path during the preloading of a turn of a superelastic coil, is path ABD FIG. 9, although numerous other loading paths exist whereby loading can occur to a point between B and D, for example C. During or after installation of the screw/coil assembly, the preloaded turns will unload, thereby undergoing radial expansion, in response to substrate recession or a reduction in substrate stiffness. This unloading can occur in a number of possible ways. One possible unloading path is path DEG FIG. 9, although numerous other unloading paths to any point beyond D along path DEFGA could be taken, for example, unloading to a point F, between E and G. In the case where preloading was done to a point between B and D on FIG. 9, unloading can occur to any point along numerous sub-pathways, one such example being CGA It is also possible to facilitate partial unloading of the superelastic coil turns following preloading and prior to installation of the screw/coil assembly in the substrate lumen.

Similarly, the spring-back from the tilting or torquing of the coil turns will provide an even and predictable thrusting force that keeps the screw pushing into the substrate lumen, due to the superelastic loading and unloading torque-twist behavior of the coil turns in a manner similar to the superelastic bending moment-curvature behavior described above.

For orthopedic use, the coil can be designed to respond in the same manner as the bone itself to loads and shocks, thus reducing stress concentrations at the site of the repair. Where the screw system is used to hold two bones together, the strength of the tilting and the amount of expansion of the coil can be set for the optimum pressure required to hold the two bones together to promote bone growth and mending. This feature also applies to all other uses.

The system that is the subject of this patent is particularly well suited to environments that have large swings in temperature or where vibration is present. Space structures that have huge temperature swings would benefit from the attachment system described herein. Engines and airframes would also be able to make use of the attachment system herein describe.

BRIEF DESCRIPTION OF THE DRAWINGS

The detailed description particularly refers to the accompanying figures in which:

FIG. 1 is a perspective view of a coil 1 with an approximate rectangular cross section.

FIG. 2 is a cross-sectional view of a screw 4 with two interleaved helical threads 5a and 5b.

FIG. 3 is a perspective view of the said coil 1 loaded around the screw 4 with the threads 5a and 5b of the screw falling between the turns 2 of the coil.

FIG. 4 is a cross-sectional view of the substrate 9 into which has been bored a hole, and threads 10 have been cut into the walls of the hole to accommodate the coil 1 and screw 4.

FIG. 5 also illustrates how the proximal thread 5a and distal thread 5b pair holds the turns of the coil in its torqued position preventing it from springing back while it is radially loaded, prior to radial expansion.

FIG. 6 illustrates the coil 1 in its partly expanded form and the turns of the coil 2a have sprung back from their fully torqued position to push 14 the screw 4 into the lumen of the substrate 9. FIG. 6 also illustrates the distal thread 5b and the proximal thread 5a, the latter of which allows the turns of the coil 2 to spring back due to its smaller size and in some preferred embodiments its curved surface 11.

FIG. 7 also shows a method of detachably attaching the proximal end of the coil to the screw 4 by applying a force 18 or 19 to a curved section 16 of the proximal end of the turn of the coil 2.

DETAILED DESCRIPTION OF THE DRAWINGS

Figure 5:
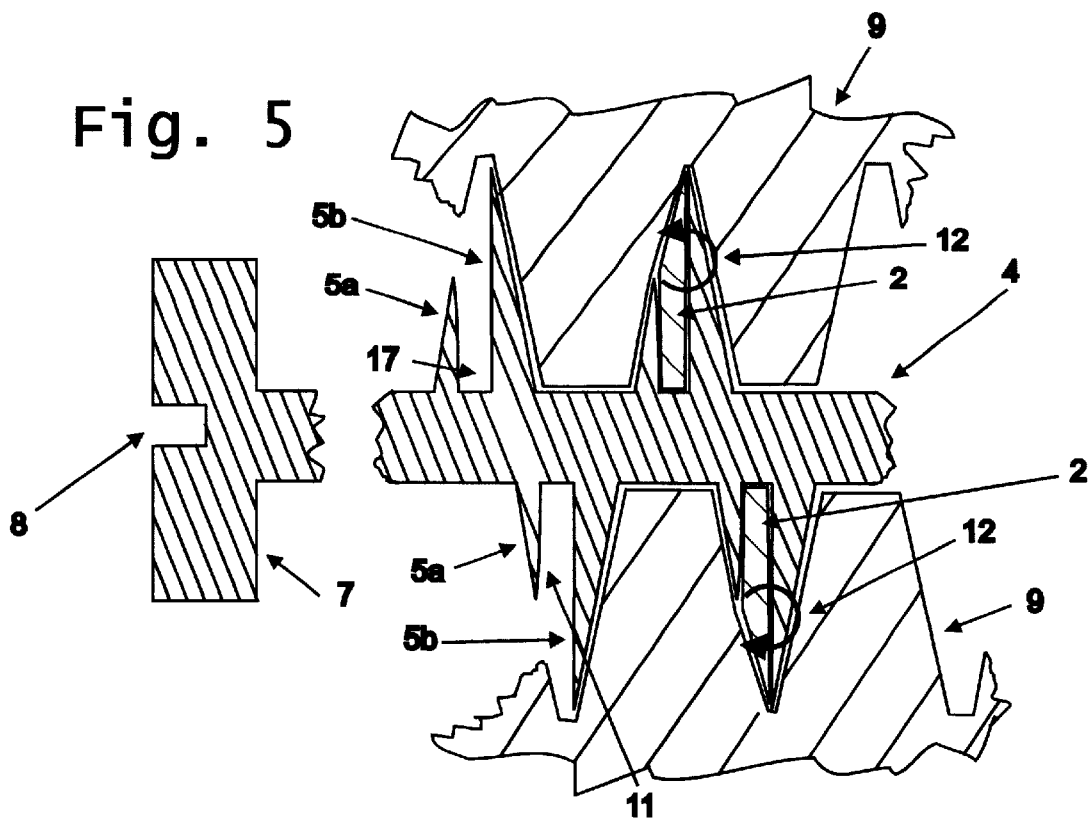
FIG. 5 is a cross-sectional view of screw 4 and coil 1 which have been threaded into a hole in the substrate 9. The cross-sectional shape of the coil 3 in this illustration is shaped approximately as a rectangle with a beveled edge that when combined with the threads 5a and 5b form a single more robust thread.

FIG. 1 illustrates a coil 1, which can have one or more turns 2 and have dimensions required by the use to which it is employed. The cross section 3 can be any shape that provides a purchase to the screw 4 illustrated on FIG. 2 and its threads 5a and 5b that is threaded into the lumen of the said coil 1, as illustrated in FIG. 3, and a purchase for the thread or surface 10 on the inside of the substrate 9 both shown on FIG. 4. The screw includes a means for turning it 8, in this case a slot in the head of the screw 4. The cross-section can include such shapes as a beveled, rectangle, as shown on FIG. 1, or any other shape that will provide the said necessary purchase to substrate 9 and screw 4. The shape of cross-section 3 will depend largely on the mechanical properties of the substrate and in particular its strength and tendency to recede with time from away from the original interface between the coil 1 and the substrate 9. Likewise the cross-sectional shape of the screw 4 and screw threads 5a and 5b, can be of any shape to properly mate with the coil 1 and to allow for the coil to expand and control the position of the coils with respect to the screw 4 and the substrate 9. The height of threads relative to each other and to the turns of the coil which they bracket can vary depending upon the exigencies of the substrate and use.

The distinguishing feature of this invention is the double helical threads 5a and 5b that brackets the coil 1. FIG. 5 illustrates only two of the turns of the coil 2, for diagrammatical clarity. The preferred embodiment illustrated is only one of many combinations that incorporate the invention herein. The relative sizes of the distal 5b and proximal 5a threads can vary and their shape can vary depending upon the loads required and the substrate into which the screw is inserted. It should be appreciated that while the interleaved helical threads 5a and 5b are referred to as distinct threads, they could be manufactured as a single thread and then have a groove of various shapes cut into it to form a similar configuration.

The advantages of using a double thread to bracket the coil are many. First, if the coil is fabricated to spring back 12, as described above, and to push the screw 4 in the direction 14 as shown of FIG. 6, the bracketing threads can maintain the coil in the loaded position, prior to appreciable radial expansion, without recourse to adhesives and provided that the coil has some form of attachment to the screw at the distal and proximal ends to prevent premature expansion; although detachably attaching the coil 4 to the distal or proximal threads or both at other points by various means remains an option in some preferred embodiments of the invention. Once the substrate recedes and the radially loaded coil expands, by means described above, the coil 2a as shown of FIG. 6 is free to spring back and roll over the proximal thread 5a. The fact that the proximal thread 5a is shorter than the distal thread 5b, allows for this spring-back rotation even though the turn of the coil 2 has radially expanded away from the screw 4 only a small distance. This spring back rotation can thus push the screw 4 in direction 14, thereby more securely pushing the screw into the substrate, even at an early stage in the recession of the substrate 9 away from the screw 4. The proximal thread 5a can also be curved 11 as shown on the detail on FIG. 2 to create the same effect. The curving of the proximal thread allows for it to be larger relative to the distal thread 5b, which for some applications may be an advantage. Both the relative size and shape of the distal and proximal threads can therefore be varied by combining shapes and sizes to suite the screw system to the particular purpose.

FIG. 5 also illustrates how the lateral forces, running from the distal end to the proximal end of the screw along its longitudinal axis, that are applied by the screw 4 to the substrate 9 by the torquing of the screw are distributed between the distal 5b and proximal 5a threads and the turns of the coil 2. This makes the screw system much more robust and suitable for those applications that require high torquing loads on the screw.

The proximal thread 5a also prevents the turns of the coil 2 from rolling off the distal thread 5b, in a direction opposite to the spring-back direction 12, as the coil expands radially. This is the principle advantage of the system that allows for high torquing loads on the screw while at the same time allowing for the screw system to expand and follow the receding substrate. The fact that this can be accomplished in one preferred embodiment of the invention by using a small proximal thread 5a means that there is more bulk substrate that has not been excessively displaced and is therefore available between the threads to hold the screw securely.

Figure 6:
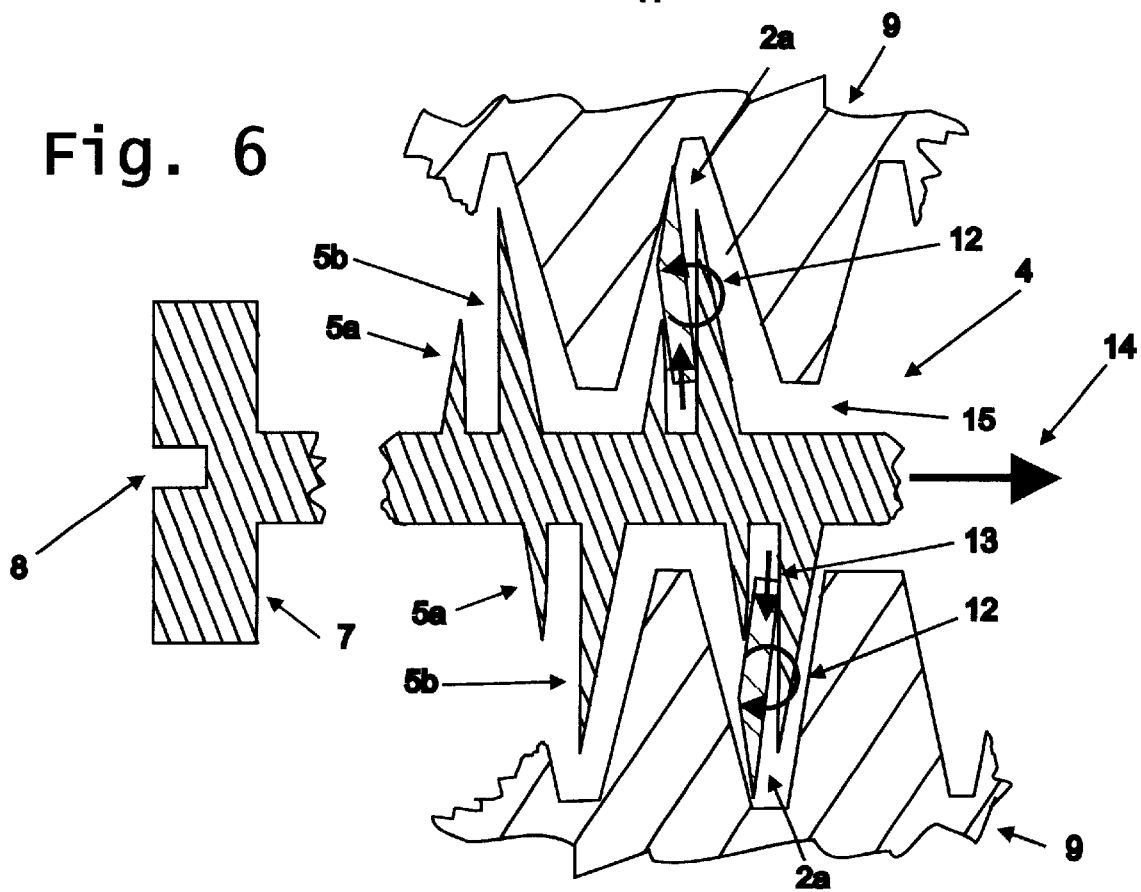
FIG. 6 is a cross-sectional view of the screw 4 and coil 1 as illustrated in FIG. 5, however the substrate 9 has receded away from the original screw and substrate interface, and the coil, which was radially loaded expands outward to maintain contact with the threads on the inside walls of the hole in the substrate.

A further advantage of the bracketed coil system is that the distances between the distal 5b and proximal 5a threads can be enlarged, allowing for the turns of the coil to rotate in the direction 12 as illustrated on FIG. 5 and FIG. 6, or to rotate in the opposite direction which allows for the torquing of the turns of the coil 2 by the operator turning the screw after the head of the screw contacts the substrate and forward motion into the substrate is thereby stopped. Once the torquing of the turns is thus set, the turns would spring back in direction 12 and thereby push the screw 4 further into the substrate 9 in direction 14 as shown on FIG. 6. This method of imparting a torquing action on the threads is in addition to those other methods described herein, so that one can use one or any of the methods in combination.

FIG. 5 illustrates the system when the spring coil has been loaded radially or tilted or both and restrained; or when it has had imparted into it a shape that will be recovered upon application of heat, or both.

FIG. 6 illustrates the system when the spring coil has been released from its constraints or has been heated to or above the austenitic finish temperature and has recovered its larger diameter or tilted shape or both. The final turns of the screw 4 may also have loaded additional torque or tilt to the turns that will unwind or spring-back in direction 12. FIG. 6 also illustrates when the substrate 9 has receded from the original interface between the coil and the said substrate, the approximately beveled rectangular cross-sections of the turns 2a of the coil 1 have followed the receding substrate and maintained purchase of the threads of the screw with the coil and in turn the coil with the threads 10 of the substrate 9.

The substrate 9 can be of any material into which the screw and coil system can be inserted. This would include bone or cartilage for orthopedic uses and metal and plastic and wood for structural or ornamental uses.

The system can include a number of coils, rather than just one, located end to end. These can be abutting or can be spaced, depending upon the circumstances. FIG. 1 illustrates a coil that is detachable attached and detaches to form in this example three separate coils. Grooves 6 fabricated into and running around the outer surface of the coil 1 approximately transversely to the longitudinal wire axis of the coil, create lines of weakness that allow the coil to separate when it is twisted or torqued, once placed inside the substrate 9. This twisting or torquing can occur when the screw is tightened into place, but can also take place later when the coil begins to expand or release its torquing action when the substrate begins to recede away from the original interface between coil and substrate. This separation of the coil allows for the coil to unwind along its longitudinal axis as it expands in the substrate without excessive frictional resistance between the surface of the coil and the mating surface 10 of the interface 9. These means of detachably attaching coils, in the event multiple coils are used, is merely illustrative and other methods of detachably attaching the coils is well known to the art, such as the use of adhesives or spot welds, to name two.

The means of attachment of the coil 1 onto the screw 4 will be explained in greater detail below, however in order to allow for the screw and coil to be turned together into the substrate, it will be necessary to at least fix the distal end of the coil to the distal end of the screw and such attachment may be detachably attachable. The said detachable attachment can be by use of adhesives, biodegradable adhesives, welds or mechanical connections such as hooks or press fit mortise and tendon or such other means well known to the art. Once in place inside the substrate, the means of attachment, except for perhaps the distal end of the screw and coil, should be detachable so that the coil is free to expand with the receding interface between the coil 1 and substrate 9. This detachment can occur, for example, due to the torquing action imparted on the coil by the tightening of the screw, or by biological degradation of the adhesive bond mentioned above. The methods of attaching the coil to the screw are described in that U.S. patent application Ser. No. 09/541,508 of Unsworth and Waram above referred to and these can all be utilized in the attachment of preferred embodiments of the present invention. However, because the coil is positioned between two interleaved helical threads in preferred embodiments of the present invention, the coil in many cases need only be detachably attached to the screw at the distal and proximate ends of both.

Figure 7:
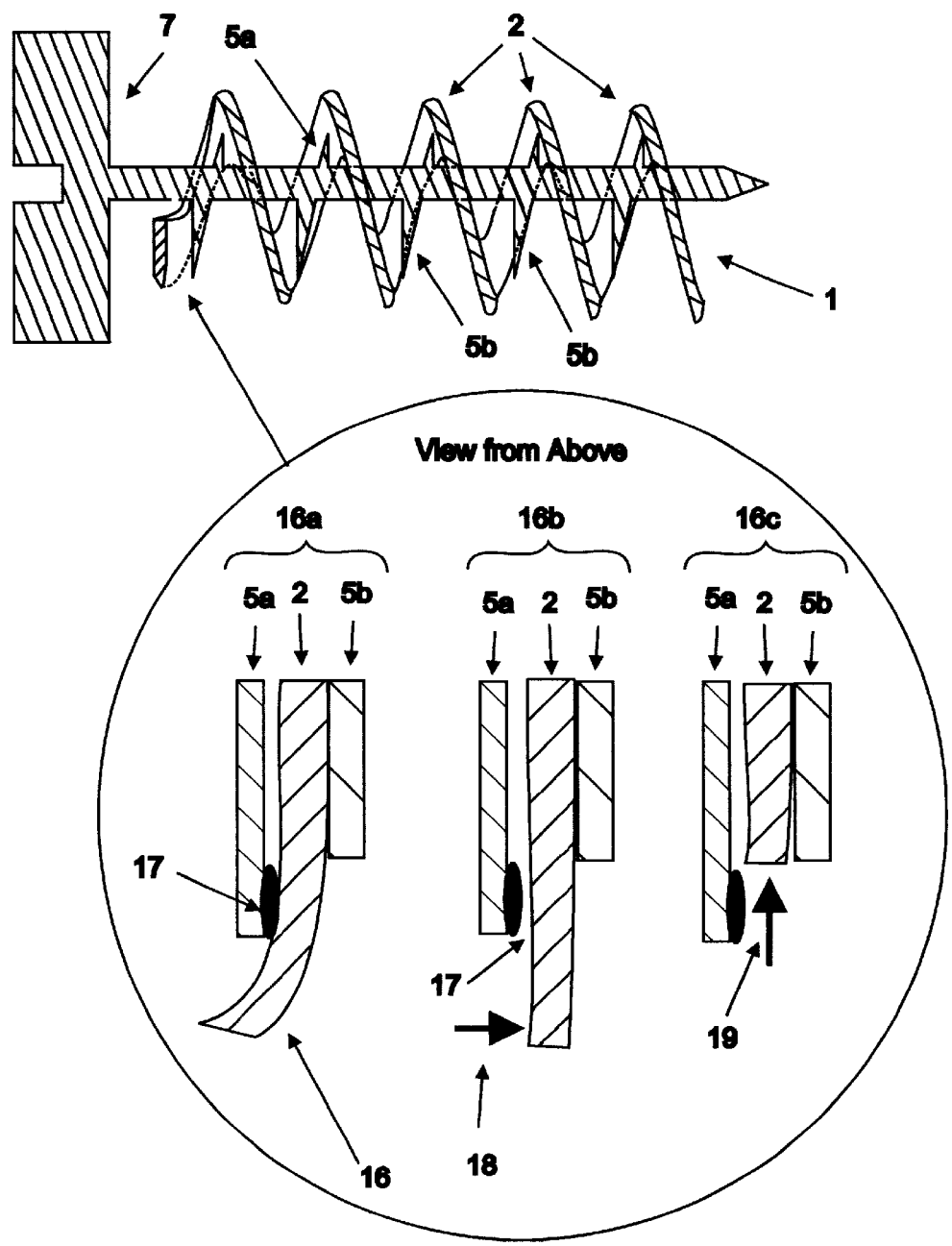
FIG. 7 is a perspective view of the said coil 1 loaded around a cross-sectional view of the screw 4 with the threads 5a and 5b of the screw falling between the turns 2 of the coil.
Figure 8:
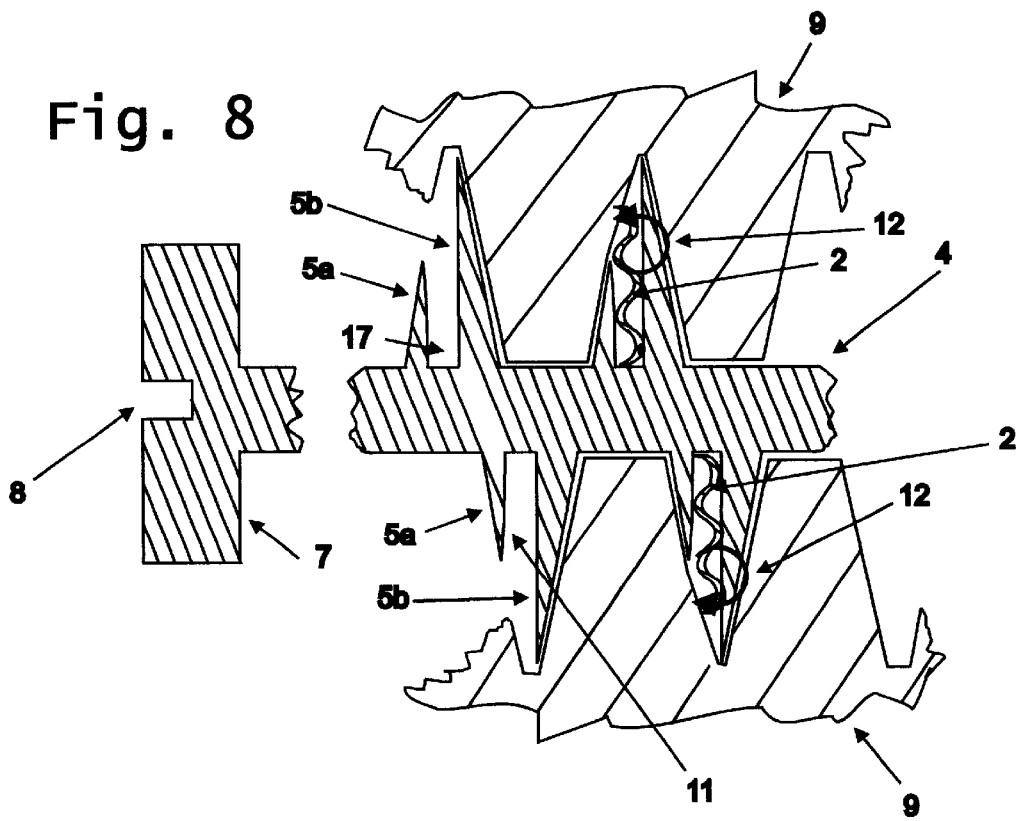
FIG. 8 illustrates a coil 1 having a corrugated cross-section 2c.
Figure 9:
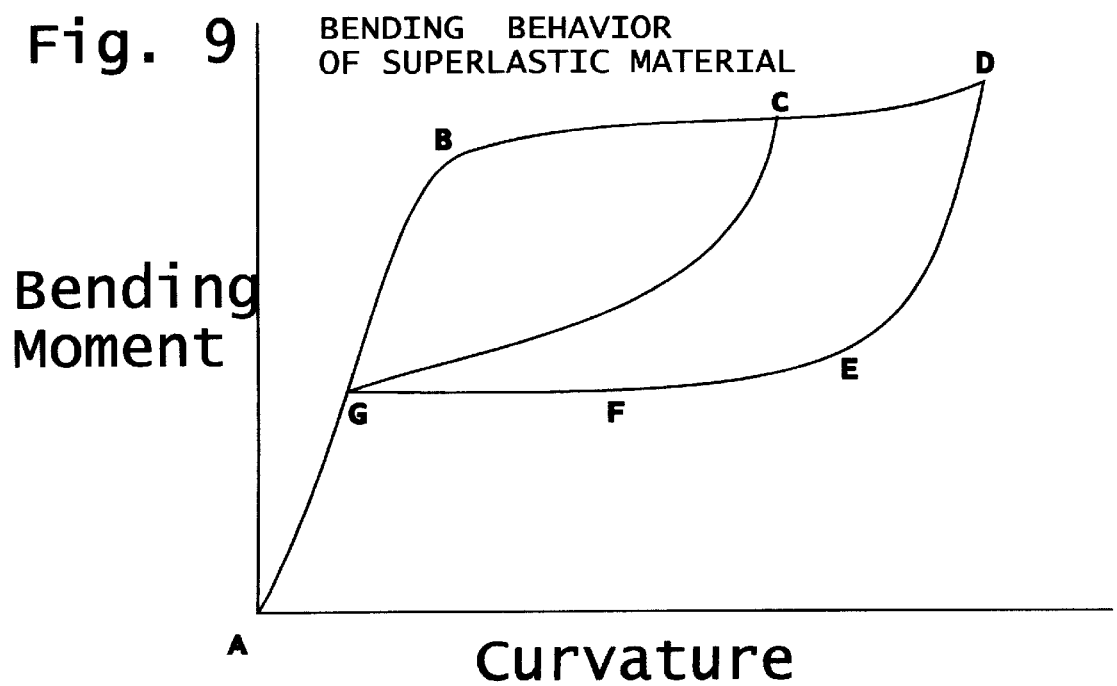
FIG. 9 is a graph illustrating bending moment behavior as a function of the curvature of a bending member.

FIG. 7 illustrates one mechanical method by which the coil 1 might be detachably attached to the screw 4 at the proximal end. The space between the distal and proximal threads could be greater at the proximal end, providing space for the proximal end of the coil to be curved and then tacked 17 by laser welding or other suitable means well known to the art, to one of the threads, in this case the proximal thread 5a as shown on detail 16a. The point of attachment might be broken by simply turning that part of the screw into the substrate 9 that would exert a force 18 on the curved section 16 at the proximal end of the coil straightening and moving the said proximal end toward the distal thread 5b as shown on the details 16b and 16c of FIG. 7. Alternatively, the operator could simply apply a force 19 to bend the distal curved tab, for example using gripping means, away from the thread to which it is detachably attached, thereby breaking the attachment and allowing the coil 1 to expand away from the screw 4. As shown on 16c, when the coil 1 expands, the part of the turn 2 tends to move in direction 20.

It should be noted that various sections, segments, or areas of the coil, no matter what their cross-section, due to their flexibility, act somewhat independently, and therefore uneven recession by the substrate 9 can be accommodated by the coil 1 as the coil follows the threads 10 of the substrate 9 in recession.

The attachment at the distal tip of the screw 4 and the distal end of the coil 1 will be in most preferred embodiments detachably attachable, but could be permanent. This distal connection will be important in screwing the assembly into the substrate 9, as once the first few turns of screw 4 and coil 1 are in the substrate, the coil will be pulled in and the threads 10 of the substrate 9 will guide the following and proximal parts of the coil and screw.

There are various means of providing heat to recover the shape of the coil to provide torque and expansion of the coil as described above. It is possible to rely on the heat of the substrate itself if the temperature of the substrate is equal to or above the austenite finish temperature of the shape memory alloy (SMA) material and does not go below the martensite start temperature of the shape memory alloy (SMA) material (which would cause the coil to loose its strength and shape). In order to prevent premature activation of the coil, the temperature of the substrate could be lowered temporarily to below the austenite start temperature of the shape memory alloy (SMA) material, during the installation of the screw and coil into the substrate lumen, and then subsequently raised by active or passive means to or above the austenite finish temperature, once the screw and coil are properly positioned within the substrate lumen. In the case where the shape memory alloy (SMA) material has an austenite start temperature, or possibly in some situations an austenite finish temperature, equal or below the ambient temperature of the shipping, storage, and installation environments, the coil could be cooled by some means such as refrigeration or submersion in liquid nitrogen, or packed in dry ice, after being manufactured and prior to installation. In the case of orthopedic use this method would be most often used where the austenite start temperature, or in some situations the austenite finish temperature, of the shape memory alloy (SMA) material is equal to or below body temperature.

It should also be noted that for simplicity of illustration, the screws and coils are not shown as being tapered at their distal tips, but this would normally be the case for most applications and does not in any way alter the principal characteristics of the preferred embodiments herein described. It should also be noted that the drawings do not show all the turns of the coil or threads for simplicity of illustration.

While the description of the preferred embodiments combines the features that give rise to the torquing action by tilting the turns 2 of the screw 4, in addition to the features that cause the coil 1 to expand, it is understood that certain embodiments of this invention may comprise both of these features together or only one of them.

While the description of the coil includes a solid or hollow tube, it should be understood that the coils can be composed of a multiplicity of wires or tubes or both, woven or intertwined in addition to any composite material. It should also be understood that a multiplicity of coils can be used rather than one. These coils could be intertwined for example in the form of a double or triple helix.

While the description speaks of a screw, it is to be understood that the member could include any fastening device that has a thread that can mesh with a coil, for example a lag bolt, or bolt and nut or threaded substrate. The coil could for example be detachably attached to a substrate, as described in the preferred embodiments above described, and the screw could then screw into the substrate and coil assembly; that is this preferred embodiment could be just the reverse of the preferred embodiments described above.

While the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the inventions and appended claims.

What is claimed is:

1. An expandable fastener assembly for insertion into a substrate, comprising:

(a) a threaded fastener having a proximal end and a distal end, the proximal end being provided with a head having turning means, the fastener having a shank extending from the head to the distal end along a longitudinal axis, the shank being provided with double interleaved helical threads extending radially outwardly from the shank, each of said threads having a first surface generally facing the distal end and a second surface generally facing the proximal end, and each double interleaved helical thread pair being either proximal or distal; and (b) a continuous, expandable helical coil member wound around the shank of the threaded fastener, between each of the double interleaved helical thread pairs, the coil member having a radially inwardly facing portion and a radially outwardly facing portion with a thread-contacting surface extending between the inwardly and outwardly facing portions and generally facing the distal end of the fastener wherein, prior to insertion of the fastener assembly into the substrate, the coil member is in a radially compressed form; and (c) releasable securing means by which the coil member is releasably secured in its radially compressed form, along at least a portion of its length, to the shank of the fastener, wherein the releasable securing means maintains the connection between the coil member and the fastener, thereby maintaining the coil member in its radially compressed form at least until the fastener assembly is completely or substantially completely threaded into the substrate.

2. The fastener assembly of claim 1, wherein the coil member is permanently connected to the shank of the fastener at the distal end, thereof.

3. The fastener assembly of claim 1, wherein the releasable securing means is selected from the group comprising adhesives, welds or mechanical connections between the coil member and the fastener.

4. The fastener assembly of claim 3, wherein the securing means is an adhesive which is water-soluble, soluble to some other solute or biodegradable.

5. The fastener assembly of claim 1, wherein radial expansion of the coil member causes radial biasing of the radially outwardly facing portion of the coil member against the substrate, while the radially inwardly facing portion remains meshed with the double interleaved helical thread pairs of the fastener.

6. The fastener assembly of claim 1, wherein the thread-contacting surface of the coil member comprises a radially inward portion and a radially outward portion with a pivot axis therebetween, the releasable securing means releasably connecting the radially inward portion of the thread-contacting surface to the second surface of the thread along at least a portion of the coil member, the pivot axis being tangential to the coil member.

7. The fastener assembly of claim 6, wherein the twisting of the coil member about the pivot axis causes rotation of the radially inward portion of the thread-contacting surface away from the second surface of the thread, overcoming the connection provided by the releasable securing means.

8. The fastener assembly of claim 6, wherein said twisting of the coil member results in the radially outward portion of the thread-contacting surface being axially displaced toward the distal end of the fastener, thereby engaging the second surface of the thread and biasing the fastener into the substrate.

9. The fastener assembly of claim 8, wherein the twisting of the coil member is produced during tightening of the fastener in the substrate, whereby tightening draws the fastener axially in the direction of the proximal end, causing the thread to push against the coil member such that a surface of the coil member opposite the thread-contacting surface and radially outwardly of the pivot axis engages the substrate and causes pivoting of the coil member about the pivot axis.

10. A The fastener assembly of claim 9, wherein said twisting of the coil member caused by tightening the fastener results in the coil member exerting an axially directed biasing force against the second surface of the thread in a direction toward the distal end of the fastener.

11. The fastener assembly of claim 10, wherein the radially outwardly facing portion of the coil member extends radially outwardly of the thread when the coil member is in its radially compressed form.

12. The fastener assembly of claim 8, wherein the coil member is comprised of a shape memory alloy in which a martensitic state of the alloy corresponds to the radially compressed form of the coil member and the austenitic state of the alloy corresponds to the radially expanded form of the coil, and wherein said shape memory alloy is transformed from the martensitic state to the austenitic state after the fastener is inserted into the substrate.

13. The fastener assembly of claim 12, wherein the coil member has a hollow tubular cross-section or a corrugated cross-sectional shape which is deformed when the fastener is tightened, and which shape is recovered when the shape memory alloy is transformed from the martensitic to the austenitic state.

14. The fastener assembly of claim 1, wherein the coil member comprises a plurality of segments releasably connected together end-to-end.

15. The fastener assembly of claim 1, wherein a curve is provided in the proximal end of the of the coil member, which contacts the substrate on insertion, causing the distal end of the coil to detach from the thread to which it is detachably attached.

16. The fastener assembly of claim 1, wherein one of the surfaces of the first surface of the proximal thread is curved permitting the coil to rotate as it expands away from the fastening member, thereby pushing the fastening assembly into the substrate.

17. The fastener assembly of claim 1, wherein the second surface of the proximal thread and the first surface of the distal thread both make contact with the coil member such that the coil member does not roll-over the distal thread when the coil member expands away from the shank of the fastening member and the fastening member is tightened into the substrate or both.

18. The fastener assembly of claim 1, wherein the coil member comprises two interleaving coils, a first coil of which engages the first surface of the thread, and a second coil of which engages the second surface of the coil.

19. A fastener assembly for insertion into a substrate, comprising:

(a) a threaded fastener having a proximal end and a distal end, the proximal end being provided with a head having turning means, the fastener having a shank extending from the head to the distal end along a longitudinal axis, the shank being provided with double interleaved helical threads extending radially outwardly from the shank, said threads having a first surface generally facing the distal end and a second surface generally facing the proximal end, and each double interleaved helical thread pair being either proximal or distal;

(b) a continuous helical coil member wound around the shank of the threaded fastener, the coil member having a radially inwardly facing portion and a radially outwardly facing portion with a thread contacting surface extending between the inwardly and outwardly facing portions and generally facing the distal end of the fastener;

wherein the thread-contacting surface of the coil member comprises a radially inward portion and a radially outward portion with a pivot axis therebetween, the radially inward portion of the thread-contacting surface engaging the second surface of the distal thread pair prior to insertion of the fastener into the substrate, wherein tightening of the fastener in the substrate causes twisting of the coil member about the pivot axis so as to cause rotation of the radially inward portion of the thread-contacting surface away from the second surface of the thread, and said twisting of the coil member results in the radially outward portion of the thread-contacting surface being axially displaced toward the distal end of the fastener, thereby engaging the second surface of the thread and biasing the fastener into the substrate.

20. The fastener assembly of claim 19, wherein the twisting of the coil member is produced during tightening of the fastener in the substrate, whereby tightening draws the fastener axially in the direction of the proximal end, causing the thread to push against the coil member such that a surface of the coil member opposite the thread-contacting surface and radially outwardly of the pivot axis engages the substrate and causes pivoting of the coil member about the pivot axis.

21. The fastener assembly of claim 20, wherein said twisting of the coil member caused by tightening the fastener results in the coil member exerting an axially directed biasing force against the second surface of the thread in a direction toward the distal end of the fastener.

* * * * *